United States Patent [19]
Herring

[11] Patent Number: 5,778,871
[45] Date of Patent: Jul. 14, 1998

[54] DEEP FAT FRYER WITH BURNER TUBE END WELD TEMPERATURE PROTECTION

[75] Inventor: Charles W. Herring, Cary, Ill.

[73] Assignee: Keating of Chicago, Inc., Bellwood, Ill.

[21] Appl. No.: 922,407

[22] Filed: Sep. 3, 1997

[51] Int. Cl.[6] .............................. A47J 27/00; A47J 37/12
[52] U.S. Cl. ................ 126/391; 99/330; 99/403; 99/447; 126/378
[58] Field of Search ................ 99/403, 404, 407, 99/408, 409, 330, 401, 447; 126/41 R, 91 R, 299 E, 375, 390, 391, 378, 387; 210/167, DIG. 8; 431/1, 326, 328, 329; 165/109.1

[56] References Cited

U.S. PATENT DOCUMENTS

| | | | |
|---|---|---|---|
| 4,091,801 | 5/1978 | Lazaridis et al. | 126/378 |
| 4,228,730 | 10/1980 | Schindler et al. | 99/404 X |
| 4,487,390 | 12/1984 | Panora | 210/167 |
| 4,668,390 | 5/1987 | Hurley et al. | 99/408 X |
| 4,848,318 | 7/1989 | Brewer | 99/403 X |
| 4,895,137 | 1/1990 | Jones et al. | 126/391 |
| 4,913,041 | 4/1990 | Taber et al. | 99/330 X |
| 5,101,806 | 4/1992 | Hunt et al. | 126/391 |
| 5,253,566 | 10/1993 | McCabe et al. | 99/403 |
| 5,253,567 | 10/1993 | Gunawardena | 99/404 |
| 5,577,438 | 11/1996 | Amitrano et al. | 99/330 X |
| 5,632,197 | 5/1997 | Lubawy et al. | 126/391 X |
| 5,642,660 | 7/1997 | Killgore et al. | 99/403 |

*Primary Examiner*—Timothy F. Simone
*Attorney, Agent, or Firm*—Nicholas A. Camasto

[57] ABSTRACT

A deep fat fryer includes a plurality of open-ended burner tubes that are end-welded between opposing walls of the fry pot. A front heat shield is formed from a pair of steel sheets and is positioned between the wall of the fry pot and the burner so that the end weld is protected from the burner flame. Airflow is established over the end weld during operation of the burner. A rear heat shield is positioned in the rear of the burner tube and blocks the rear end weld from the hot combustion products. The spaces between the rear heat shield and the burner tube inner wall and the fry pot outer wall are filled with insulation.

13 Claims, 2 Drawing Sheets

DEEP FAT FRYER WITH BURNER TUBE END WELD TEMPERATURE PROTECTION

BACKGROUND OF THE INVENTION AND PRIOR ART

This invention relates generally to deep fat fryers and specifically to an arrangement for precluding temperature-induced failures of the end-welded junctions of the fry pot and burner tubes in such fryers.

Deep fat fryers include a fry pot having opposed walls and one or more open-ended burner tube secured (by end welds) between a pair of opposed fry pot walls. The fry pot and burner tube material are generally of stainless steel and the fry pot has flanged apertures formed therein to enable the burner tube to be end-welded thereto.

In high heat or rapid recovery deep fat fryers, the burner flame is intense and in some situations, the end welds on the burner tubes may experience an excessive rise in temperature which produces stresses in, and occasional failure of, the end welds. Part of the reason for the excessive temperature rise is the end-weld design, which partially isolates the weld from the cooling effect of the cooking oil in the fry pot. While the problem can be minimized with controlled manufacturing procedures and more costly weld materials, the solution of the present invention obviates the potential problem with very little added cost and enables more efficient manufacturing while avoiding the need for specialized materials.

OBJECT OF THE INVENTION

A principal object of the invention is to provide a novel deep fat fryer.

Another object of the invention is to provide a deep fat fryer that is less costly to manufacture.

A further object of the invention is to provide a deep fat fryer of improved reliability.

A still further object of the invention is to provide a rapid recovery deep fat fryer that minimizes the possibility of burner tube weld failure.

BRIEF DESCRIPTION OF THE DRAWINGS

These and other objects and advantages of the invention will be apparent from reading the following description in conjunction with the drawings, in which.

DESCRIPTION OF THE PREFERRED EMBODIMENT

Figure 1:
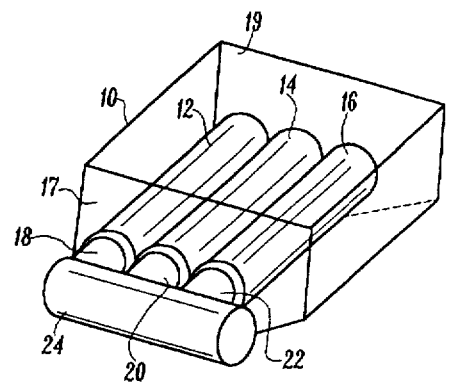
FIG. 1 is a simplified partial perspective of a prior art deep fat fryer.

Referring to FIG. 1, a prior art deep fat fryer fry pot 10 includes three open-ended burner tubes 12, 14 and 16, secured between a pair of opposed walls 17 and 19 of the fry pot. Three gas burners 18, 20 and 22 are positioned to project burner flames into corresponding ones of the burner tubes, which are supplied with gas from a manifold 24. In practice, cooking oil is in fry pot 10 and surrounds the burner tubes, which are heated by the burner flames and which, in turn, heat the cooking oil. As discussed above, the combination of the high heat burner flame in the rapid recovery deep fat fryer and the effect of the burner tube end-welded construction in restricting efficient heat transfer from the weld area to the heating oil, can create a stress failure in the weld. While the problem is more pronounced with end welds, it is also present, to a lesser degree, with conventional butt or overlap welds.

Figure 2:
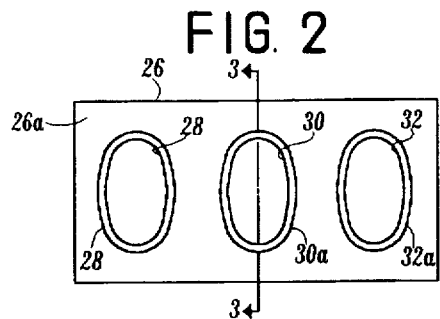
FIG. 2 is a frontal view of a front burner tube heat shield constructed in accordance with the invention.
Figure 3:
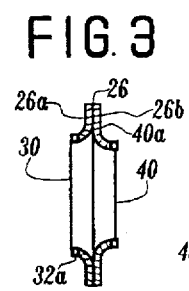
FIG. 3 is a cross section taken along the line 3—3 of FIG. 2.
Figure 4:
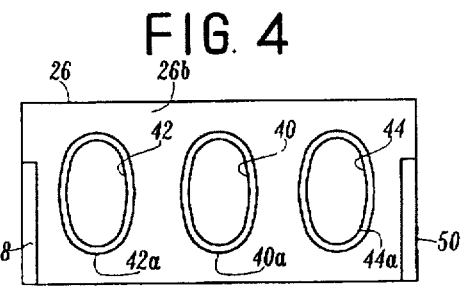
FIG. 4 is a rear view of the heat shield of FIG. 2.
Figure 5:
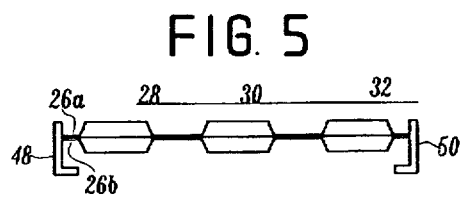
FIG. 5 is a bottom view of the heat shield of FIG. 2.

In FIG. 2, a front heat shield 26, constructed in accordance with the invention, includes three orifices 28, 30 and 32 that are shaped like the open ends of the burner tubes, but have a slightly smaller size. The orifices may be formed by stamping out the appropriate shapes from a flat stainless steel sheet 26a and have contoured lips 28a, 30a and 32a, respectively, formed therein. As shown in FIG. 4, a similar flat stainless steel sheet 26b has similarly shaped, but slightly smaller orifices 40, 42 and 44 formed therein with contoured lips 40a, 42a and 44a, respectively. The two sheets 26a and 26b are sandwiched together, preferably by a series of spot welds, and take the configuration indicated in FIGS. 3 and 5. Two L-shaped mounting plates 48 and 50 are secured to shield 26 for positioning the orifices in alignment between the burners and burner tubes, as will be seen. The cross section of FIG. 3 clearly illustrates the difference in orifice sizes.

While not required in the broader aspects of the invention, a rear heat shield is also provided for the deep fat fryer. Obviously, the welds at the rear of the burner tubes are not subjected to the direct impact of the burner flame as often occurs with the front welds. However, the hot combustion products impinging on the rear of the burner tubes can cause temperature stress problems in the rear welds, especially if they are of the end weld type.

Figure 6:
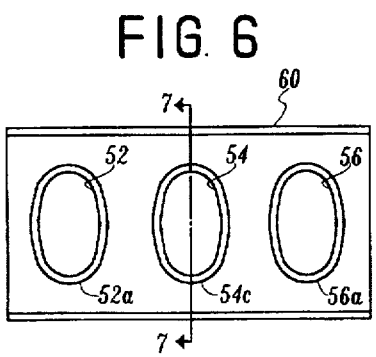
FIG. 6 is a frontal view of a rear burner tube heat shield constructed in accordance with the invention.
Figure 7:
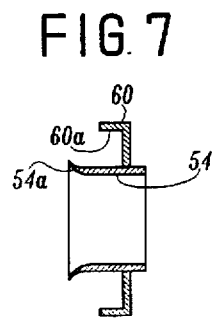
FIG. 7 is a cross section taken along the line 7—7 of FIG. 6.

In FIG. 6, a rear heat shield 60 is shown. In this shield construction, three openings are formed in the stainless steel plate and three individual heat deflection tubes 52, 54 and 56, with contoured lips 52a, 54a and 56a, respectively, are secured in respective ones of the orifices by any well known means. Angled portions 60a, formed along the edges of sheet 60, position the heat shield from the rear wall of the fry pot with the deflection tubes positioned in the ends of the corresponding burner tubes. The cross section of FIG. 7 clearly illustrates the relationship of the heat deflection tubes and shield plate.

Figure 8:
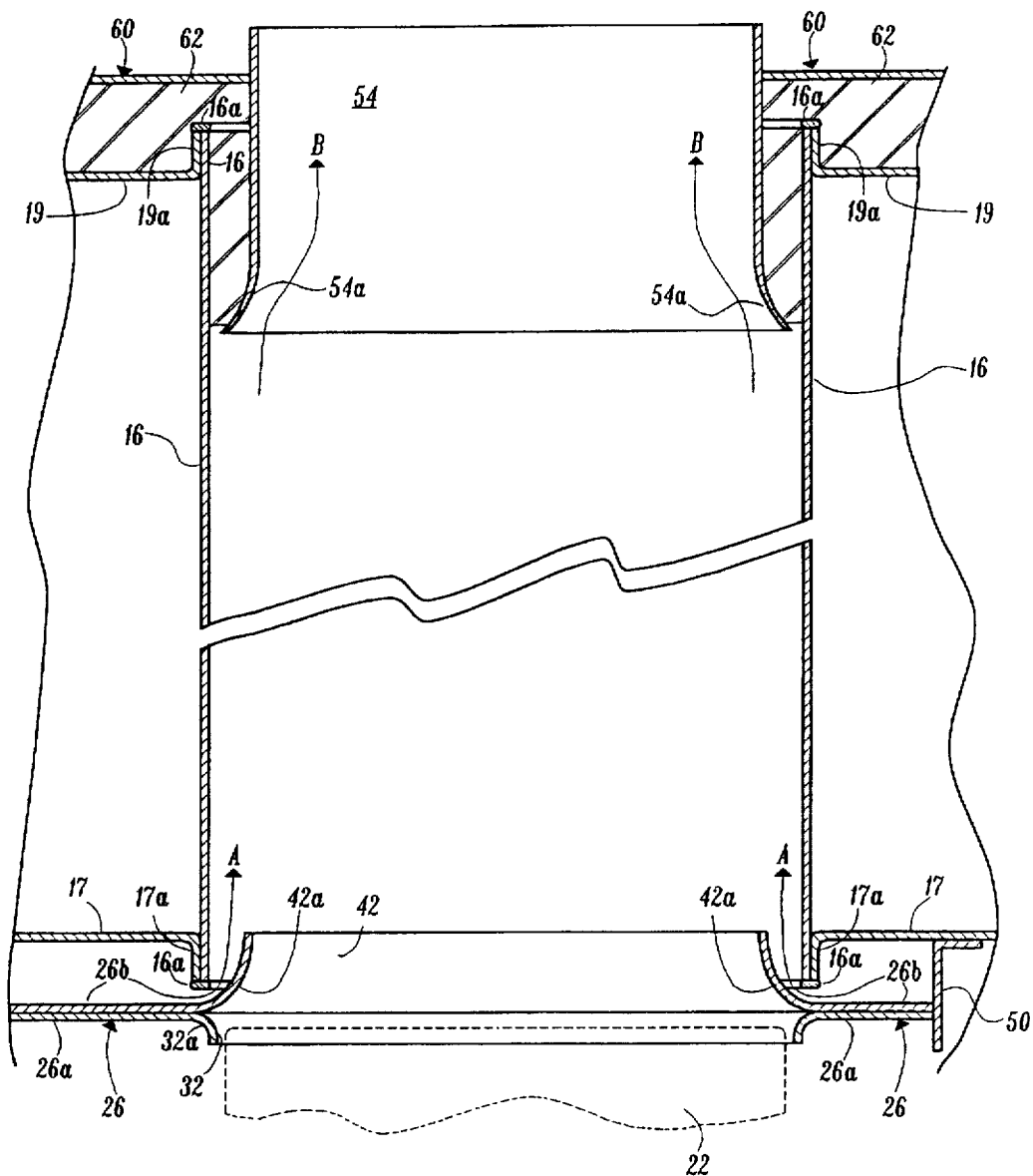
FIG. 8 is an enlarged, partial sectional view of a burner tube end-welded in a fry pot with the front and rear heat shields of the invention installed.

In FIG. 8, the arrangement for burner tube 16 is shown, with both the front heat shield 26 and the rear heat shield 60 in position at the front and the rear, respectively, of the burner tube. The position of burner 22 is indicated by dashed lines. The end welds 16a on both the front and rear open ends of burner tube 16 are also indicated. Specifically, front and rear end welds 16a join the flange 17a of front fry pot wall 17 and the flange 19a of rear fry pot wall 19, respectively. With respect to the front heat shield 26, a space exists around the welded open end of burner tube 16 which permits ambient (cool) airflow over the weld when the burner is operating. Also, front end weld 16a is blocked off from the flame from burner 32 by the rear portion 26a of front shield 26. The combined effect of the isolation of front weld 16a from the direct burner flame and the airflow over front weld 16a, acts to restrict the temperature rise at the front weld to a level where temperature induced stress failure does not occur. The arrangement for the other burner tubes is similar to that shown and described.

At the rear of burner tube 16, rear heat shield 60 positions heat deflection tube 54 closely adjacent to, but preferably not in contact with, the inner surface of the burner tube. Insulation material 62 is placed in the space between heat shield 60 and the fry pot rear wall 19 and in the space between the inner surface of burner tube 16 and heat deflection tube 54. In this manner, the rear weld 16a is shielded from the hot combustion products in the burner tube. The contoured lip 54a of deflection tube 54 aids in the free flow of combustion products out of the open-ended rear of the burner tube into a flue (not shown), where they are carried away by conventional means. It will be recognized, that details of securing the heat shields to the fry pot are not given, since such will vary depending upon the particular fry pot and deep fryer arrangement.

What has been described is a novel shielding arrangement for precluding temperature-induced stress failure in the welds between a burner tube and fry pot. It is recognized that numerous changes and modifications in the described embodiment of the invention will be apparent to those skilled in the art without departing from its true spirit and scope. The invention is to be limited only as defined in the claims.

What is claimed is:

1. In a deep fat fryer of the type including a fry pot, an open-ended burner tube secured to a wall of the fry pot by a welded junction and a burner for projecting a flame into the open end of the burner tube, the improvement comprising:

means for restricting the temperature rise of the welded junction of the burner tube during operation of the burner.

2. The fryer of claim 1, wherein said restricting means comprises a heat shield interposed between said welded junction and said burner.

3. The fryer of claim 2, wherein said heat shield defines an orifice that is smaller than the open end of said burner tube.

4. The fryer of claim 3, wherein said heat shield is formed in a plate that is larger than said open end, and further comprising:

means for spacing said heat shield from said fry pot wall for inducing the flow of air over said welded junction during burner operation.

5. A deep fat fryer comprising:

a fry pot having a wall;

an open-ended burner tube secured in said wall by a welded junction;

a burner mounted adjacent to said burner tube for projecting a flame into said open end thereof during operation of said burner; and means for restricting the temperature rise of said welded junction during operation of said burner.

6. The fryer of claim 5, wherein said restricting means comprises a heat shield interposed between said welded junction and said burner.

7. The fryer of claim 6, wherein said heat shield defines an orifice that is smaller than said open end of said burner tube.

8. The fryer of claim 7, further comprising:

a plate for supporting said heat shield; and means for spacing said plate from said wall for inducing the flow of air over said welded junction during burner operation.

9. The fryer of claim 8, wherein said welded junction comprises an end weld and wherein said heat shield has a front lipped portion having an opening that is substantially equal in size to said open end and a rear lipped portion defining said orifice.

10. The fryer of claim 5, wherein said fry pot has front and rear opposed walls and wherein said burner tube extends between said opposed walls and is welded thereto by front and rear end welds and further comprising:

front and rear means for restricting the temperature rise of both said front and rear end welds during operation of said burner.

11. The fryer of claim 10, wherein said front and rear restricting means comprise heat shields interposed between said front and rear welds and combustion products from said burner.

12. The fryer of claim 11, wherein said heat shields each defines an orifice that is smaller than the open end of said burner tube.

13. In a deep fat fryer of the type including a fry pot, an open-ended burner secured to opposite walls of the fry pot by welded junctions and a burner for projecting a flame into the open end of the burner tube, the improvement comprising:

front and rear heat shields defining orifices that are smaller than the open end of the burner tube, interposed between the front and rear welded junctions and the combustion products from the burner, for restricting the temperature rise of the welded junctions during operation of the burner.

* * * * *